E. WANDERSLEB.
PHOTOGRAPHIC FILTER.
APPLICATION FILED OCT. 6, 1908.
926,523.
Patented June 29, 1909.
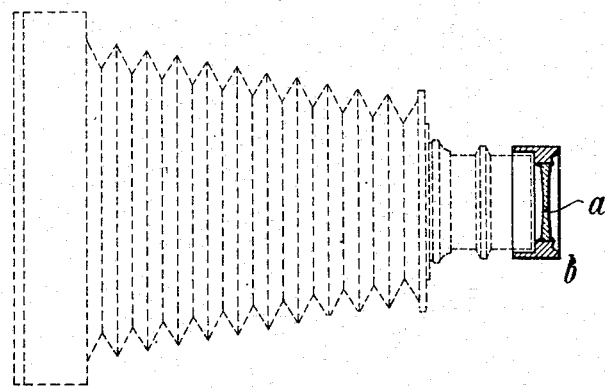
Witnesses:
Inventor:

UNITED STATES PATENT OFFICE.

ERNST WANDERSLEB, OF JENA, GERMANY, ASSIGNOR TO THE FIRM OF CARL ZEISS, OF JENA, GERMANY.

PHOTOGRAPHIC FILTER.

No. 926,523.  Specification of Letters Patent.  Patented June 29, 1909.

Application filed October 6, 1908. Serial No. 456,481.

*To all whom it may concern:*

Be it known that I, ERNST WANDERSLEB, a citizen of the German Empire, and residing at Carl - Zeissstrasse, Jena, in the Grand Duchy of Saxe-Weimar, Germany, have invented a new and useful Photographic Filter, of which the following is a specification.

The present invention relates to the yellowish filter which is applied near the objective when making exposures upon a photographic sensitive surface, between which surface and its support a polychrome intermediate layer is situated, as for example, in the lumiere "autochrome" plate. The said filter presents the form of a plate or disk in which the front and rear surfaces are plane and parallel to one another. It sometimes consists of several consecutive parts cemented or otherwise tightly united together. To form such composite yellowish filters, layers of differently colored media, for instance, have been combined or one or two colorless disks utilized as carriers or protecting covers for the filter medium proper, such medium being either fluid or solid.

Without restricting freedom in the employment of simple or variously composite filters, according to the present invention these filters are only modified with a view to rendering them available for a second purpose. As already known, in exposures upon the sensitive surfaces above mentioned, light has to penetrate the polychrome intermediate layer before it reaches the photographic sensitive surface. The support of the sensitive surface is therefore given a position in the camera the reverse of that obtaining in ordinary photography, so that the said surface lies at the back of the support, that is to say, on the side remote from the objective. In exposures either a filter of any thickness is to be placed in front of the objective and the distance between the latter and the said support (obtaining in the case of ordinary exposures) reduced by a certain amount which is somewhat smaller than the thickness of the support; or a filter having about double the thickness of the support is to be set behind the objective. In the latter case, the reduction in distance between the objective and the support is dispensed with, as the effect of the thick filter is to restore the coincidence of the image plane and the sensitive surface. When the first of these two methods is followed, in focusing by shifting the objective according to the ordinary scale of distance, a final shifting has afterward to be made. In focusing by means of a ground glass screen it is necessary, that this screen have the same thickness as the support of the sensitive surface and be reversely placed in the camera, so that the ground side is remote from the objective. When the second of the said methods is followed, the objective is only to be shifted according to the ordinary scale or the screen used in the ordinary way. In spite of its apparent simplicity, the second method—setting the yellowish filter behind the objective—is seldom made use of, because the insertion of the filter into the interior of the camera is particularly troublesome and in addition thereto an undesirable time-wasting operation, above all when focusing by means of the screen, since the time occupied between focusing and exposure is much more prolonged when the filter is to be set behind the objective than when placed in front.

By the present invention the filter placed in front of the objective is invested with the advantage hitherto only possessed by the filter set behind the objective, viz., that the ordinary modes of focusing remain in use. According to this invention a yellowish filter is made use of which has not as hitherto the effect of a homogeneous plano-parallel plate, but that of a weak dispersive lens, by virtue of one or several (external or internal) surfaces being spherical. In consequence of this filter lens acting in coöperation with the objective, the focal length of the latter is, as it were, increased a little, which increase corresponds to the rearward displacement of the sensitive surface.

In the accompanying drawing a filter according to the invention is represented as applied in front of the objective of a photographic camera. It consists of a yellowish biconcave lens *a*, the mount *b* of which is adapted to be slid upon the objective casing.

The increase in the focal length of the objective incidental to the filter lens should amount to about two-thirds of the thickness of the support, that is 1 mm, when this thickness is 1.5 mm. If the focal length of the objective proper be 150 mm, a negative focal length of the filter lens of 22.5 meters would just bring about this increase. The same filter lens would also suffice for objectives of 145 mm and of 155 mm focal length, without the position of the image being so much displaced relatively to the sensitive surface as the casual differences in the thickness of the supports would amount to. In general, the greater the focal length of the objective, the greater must the focal length of the filter lens be chosen.

The displacement of the image due to the influence of the filter lens is not independent of the distance of the object to be taken, but the fluctuations in displacement, for the ordinary distances at which photographs are usually taken and which represent a high multiple of the focal length of the objective, are again smaller than the casual differences in the thickness of the supports.

I claim:

A yellowish light filter for polychrome exposures, constructed to act as a weak dispersive lens and adapted to be connected with the camera in front of and coaxially to the objective.

ERNST WANDERSLEB.

Witnesses:
PAUL KRÜGER,
FRITZ SANDER.